US010701626B2

(12) United States Patent
Geller

(10) Patent No.: US 10,701,626 B2
(45) Date of Patent: *Jun. 30, 2020

(54) WIRELESS ACCESS POINT RESOURCE AVAILABILITY, NOTIFICATION, AND NETWORK MANAGEMENT

(71) Applicant: Time Warner Cable Enterprises LLC, St. Louis, MO (US)

(72) Inventor: Steven I. Geller, Kensington, MD (US)

(73) Assignee: Time Warner Cable Enterprises LLC, St. Louis, MO (US)

(*) Notice: Subject to any disclaimer, the term of this patent is extended or adjusted under 35 U.S.C. 154(b) by 0 days.

This patent is subject to a terminal disclaimer.

(21) Appl. No.: 16/280,500

(22) Filed: Feb. 20, 2019

(65) Prior Publication Data
US 2019/0182763 A1 Jun. 13, 2019

Related U.S. Application Data

(60) Division of application No. 15/158,683, filed on May 19, 2016, now Pat. No. 10,244,466, which is a continuation of application No. 14/479,399, filed on Sep. 8, 2014, now Pat. No. 9,363,747.

(51) Int. Cl.
H04W 48/20 (2009.01)
H04W 48/08 (2009.01)
H04W 72/04 (2009.01)
H04W 72/08 (2009.01)
H04W 48/16 (2009.01)

(52) U.S. Cl.
CPC ............ H04W 48/20 (2013.01); H04W 48/08 (2013.01); H04W 72/042 (2013.01); H04W 72/0413 (2013.01); H04W 72/085 (2013.01); H04W 48/16 (2013.01)

(58) Field of Classification Search
CPC ...... H04B 7/024; H04B 7/063; H04B 7/0632; H04B 7/0639; H04B 7/0456; H04B 7/0617; H04B 7/0626; H04B 7/068; H04L 5/001; H04L 5/0035; H04L 5/0048; H04L 5/0057; H04L 5/0078; H04L 5/0094; H04L 5/00
USPC ................................ 370/329; 455/509, 524
See application file for complete search history.

(56) References Cited

U.S. PATENT DOCUMENTS 7,542,761 B2 6/2009 Sarkar
2003/0236827 A1 12/2003 Patel et al.
2007/0244742 A1 10/2007 Short et al.
(Continued)

Primary Examiner — Inder P Mehra
(74) Attorney, Agent, or Firm — Armis IP Law, LLC

(57) ABSTRACT

A connection management resource receives performance information indicating bandwidth availability associated with multiple wireless access points in a wireless network. The connection management resource analyzes the performance information to identify an ability of each of the multiple wireless access points in the wireless network to provide a prospective new user access to a remote network. Based on the analysis of the performance information, the connection management resource produces a notification indicating the ability of each of the multiple access points to provide wireless bandwidth to the prospective new user to access the remote network. Via the notification, the prospective new user of a wireless access point is able to determine what to expect for bandwidth after establishing a respective link with the wireless access point.

29 Claims, 11 Drawing Sheets

(56) References Cited

U.S. PATENT DOCUMENTS

| | | | |
|---|---|---|---|
| 2008/0049649 A1* | 2/2008 | Kozisek | H04L 45/125 370/310 |
| 2008/0298241 A1 | 12/2008 | Ohana et al. | |
| 2010/0278158 A1* | 11/2010 | Lee | H04W 48/20 370/338 |
| 2012/0282889 A1 | 11/2012 | Tanaka et al. | |
| 2012/0322407 A1 | 12/2012 | Haberman | |
| 2014/0003336 A1 | 1/2014 | Padden et al. | |
| 2014/0286246 A1 | 9/2014 | Bao et al. | |
| 2014/0347985 A1 | 11/2014 | Yi et al. | |
| 2015/0029930 A1* | 1/2015 | Horn | H04W 48/02 370/312 |
| 2015/0052572 A1* | 2/2015 | Schemmann | H04L 12/2801 725/116 |
| 2015/0138963 A1* | 5/2015 | Lee | H04W 4/027 370/230 |
| 2016/0330714 A1 | 11/2016 | Hedayat et al. | |

* cited by examiner

WIRELESS ACCESS POINT RESOURCE AVAILABILITY, NOTIFICATION, AND NETWORK MANAGEMENT

RELATED APPLICATIONS

This application is a divisional application of earlier filed U.S. patent application Ser. No. 15/158,683 entitled "WIRELESS ACCESS POINT RESOURCE AVAILABILITY, NOTIFICATION, AND NETWORK MANAGEMENT,", filed on May 19, 2016, the entire teachings of which are incorporated herein by this reference.

U.S. patent application Ser. No. 15/158,683 is a continuation of earlier filed U.S. patent application Ser. No. 14/479,399 entitled "WIRELESS ACCESS POINT RESOURCE AVAILABILITY, NOTIFICATION, AND NETWORK MANAGEMENT,", issued as U.S. Pat. No. 9,363,747, filed on Sep. 8, 2014, the entire teachings of which are incorporated herein by this reference.

BACKGROUND

Conventional RF (Radio Frequency) technology has been used for many years to connect wireless devices such as phones, laptops, etc., to a landline network and/or other wireless networks. Today, RF technology supports many different types of connection services such as voice communications, high-speed data services, WiFi™ connectivity, and so on.

One type of RF technology is known as Wi-Fi™. This more recently implemented wireless technology includes large-scale installation of so-called WiFi™ base stations (also known as access points). In comparison to the conventional long-range cellular network technology, WiFi™ technology supports short-range communications such as 200-300 meters as opposed to 1500 or more meters provided by cellular telephone base stations. In comparison to installation of cellular telephone towers, installation of a respective WiFi™ base stations is substantially less expensive.

The wireless coverage in a vicinity of a respective WiFi™ base station is sometimes called a WiFi™ hot spot. In general, a hot spot is a location where one is able to operate a communication device and access the Internet through a corresponding WiFi™ access point. As mentioned, wireless coverage provided by a WiFi™ base station is typically much smaller than wireless coverage provided by a corresponding long-range base station disposed on a cellular phone tower.

When located within the WiFi™ hotspot, a mobile device operated by a corresponding user is able to establish a wireless communication link between the mobile device and the WiFi™ base station. Via communications over the wireless communication link, and one or more additional communication links, the mobile device has access to hardwired networks and is able to perform operations such as retrieve data from and transmit data to other resources in a network environment.

In certain instances, a geographical region may include multiple WiFi™ base stations. The user of a respective mobile communication device may be able to choose which of the multiple WiFi™ base stations to establish a wireless connection. For example, each of the multiple WiFi™ base stations typically transmits one or more communications indicating their availability to prospective users. A user operating a respective mobile communication device in the geographical region receives communications from each of the available WiFi™ base stations in the geographical region. According to certain conventional techniques, the user operating the mobile communication device selects from the different available WiFi™ base stations depending upon which of the WiFi™ base stations produces a communication signal received at the mobile communication device having the highest signal strength.

BRIEF DESCRIPTION OF EMBODIMENTS

Conventional techniques of selecting from multiple available wireless access points to access a remote network such as the Internet can suffer from deficiencies. For example, as previously discussed, according to conventional techniques, a user or device may be able to identify which of the multiple WiFi™ base stations provides a strongest signal to the mobile communication device. However, the WiFi™ base station that produces the strongest received signal at the mobile communication device may have little or no extra bandwidth available to support wireless communications with the additional mobile communication device. In such an instance, the user experience of receiving and transmitting data using the wireless base station may be poor. In other words, selection of the wireless base station that produces the strongest received signal strength at the mobile communication device does not ensure that the corresponding mobile communication device will be able to receive and transmit data over the wireless communication link at a sufficiently high data rate to satisfy the user. Thus, it is quite possible that the wireless access point that produces the strongest received signal strength at the mobile communication device has little or no available bandwidth for use by a prospective new user.

Embodiments herein deviate with respect to conventional techniques. For example, one embodiment herein is directed to providing notification of an ability of each of multiple wireless access points to provide a prospective new user of a wireless communication device access to a remote network such as the Internet. In one embodiment, prior to or after establishing a data communication link, the notification provided to the prospective new user and corresponding device identifies which of multiple available wireless access points is best suited to provide a desired data throughput capability.

More specifically, in accordance with one embodiment, a connection management resource receives performance information indicating metrics such as bandwidth capability associated with each of multiple wireless access points in a wireless network. The connection management resource analyzes the performance information to identify an ability of each of the multiple wireless access points in the wireless network to provide the prospective new user sufficient wireless bandwidth to access the remote network. Based on the analysis of the performance information, the connection management resource produces a respective notification indicating the relative ability of each of the multiple access points to provide wireless bandwidth to the prospective new user to access the remote network.

Note that the performance information analyzed by the connection management resource to generate the notification can be any suitable type of information indicating the ability of the corresponding wireless access point to support current or additional wireless communications. The performance information can be received from any of one or more suitable types of resources (such as users, mobile communication devices, wireless access point, access point controllers, etc.) in a network environment.

In one embodiment, the notification apprises the prospective new user of the available bandwidth associated with each of the wireless access points. To notify the prospective new user which of one or more available wireless access points is able to provide a good wireless connection to access the remote network, the connection management resource initiates transmission of the notification to the prospective new user and/or corresponding device.

As a more specific example, assume that the prospective new user operates a corresponding mobile communication device to access the remote network. In such an instance, the mobile communication device receives input from the prospective new user indicating a desire to access the remote network via communications through one of multiple wireless access points present in the wireless network.

If so configured, the mobile communication device operated by the prospective new user can notify the connection management resource which of multiple wireless access points are candidate wireless access points within wireless communication range of the mobile communication device. For example, the mobile communication device or other suitable resource can determine which of multiple in-range wireless access points in a geographical region are good candidates to establishing a wireless connection based on one or more metrics such as received signal strength, signal-to-noise ratio, etc., associated with received wireless signals from the access points. In one embodiment, the mobile communication device communicates with the connection manager resource to retrieve the notification indicating which of the candidate wireless access points in the wireless network are able to provide an appropriate bandwidth to the prospective new user.

In accordance with further embodiments, the notification produced by the connection management resource can indicate a respective magnitude of wireless bandwidth available from each of the multiple wireless access points prior to the mobile communication device establishing a respective wireless communication link. If desired, the prospective new user can initiate display of the notification on a display screen of the communication device operated by the user.

In accordance with still further embodiments, the displayed notification can indicate a ranking of each of the multiple wireless access points based on wireless bandwidth each of the multiple wireless access points is expected to provide the user access to the remote network after establishing of a respective communication link.

In accordance with further embodiments, the ranking produced by the connection management resource can be configured to indicate a corresponding anticipated amount of bandwidth that each respective access point in the set has available to provide the prospective new user access to the remote network. Thus, in accordance with one embodiment, a user and a respective mobile communication device is able to identify an amount of bandwidth to expect to receive from a respective wireless access point prior to actually establishing a wireless connection.

In yet further embodiments, the connection manager resource or other suitable resource ranks the multiple access points in the notification based on a metric such as a magnitude of available wireless bandwidth that each respective access point of the multiple access points has available to provide connectivity between a communication device operated by the prospective new user and the remote network. Based on the ranking, the user viewing the notification is able to identify which of the multiple wireless access points provides the best bandwidth.

The prospective new user (or corresponding mobile communication device) then provides further input to the communication device to select a wireless access point from the wireless access point ranking information as specified by the notification. For example, in one embodiment, the input from the user or other entity (such as an executed software application) specifies a selection of a wireless access point (such as one that provides the highest available bandwidth) from the multiple wireless access points indicated in the notification as being available. The mobile communication device then establishes a wireless communication link with the selected wireless access point to access the remote network.

In this manner, in contrast to conventional techniques, a prospective new mobile communication device and/or corresponding user is able to select a respective wireless access point that is able to meet desired data throughput needs. In other words, as previously discussed, based on the notification, the prospective new user is able to identify an amount of bandwidth he/she should expect after establishing a respective communication link with the selected wireless access point.

These and other more specific embodiments are disclosed in more detail below.

Note that any of the resources as discussed herein can include one or more computerized devices, servers, base stations, wireless communication equipment, communication management systems, workstations, handheld or laptop computers, or the like to carry out and/or support any or all of the method operations disclosed herein. In other words, one or more computerized devices or processors can be programmed and/or configured to operate as explained herein to carry out different embodiments of the invention.

Yet other embodiments herein include software programs to perform the steps and operations summarized above and disclosed in detail below. One such embodiment comprises a computer program product including a non-transitory computer-readable storage medium (i.e., any physical computer readable hardware storage medium) on which software instructions are encoded for subsequent execution. The instructions, when executed in a computerized device (e.g., computer processing hardware) having a processor, program and/or cause the processor to perform the operations disclosed herein. Such arrangements are typically provided as software, code, instructions, and/or other data (e.g., data structures) arranged or encoded on a non-transitory computer readable storage medium such as an optical medium (e.g., CD-ROM), floppy disk, hard disk, memory stick, etc., or other a medium such as firmware in one or more ROM, RAM, PROM, etc., or as an Application Specific Integrated Circuit (ASIC), etc. The software or firmware or other such configurations can be installed onto a computerized device to cause the computerized device to perform the techniques explained herein.

Accordingly, embodiments herein are directed to a method, system, computer program product, etc., that supports operations as discussed herein.

One or more embodiments herein include a computer readable storage medium and/or system having instructions stored thereon. The instructions, when executed by computer processor hardware, cause the computer processor hardware (such as in a mobile computer device) to: receive performance information indicative of bandwidth availability in a wireless network; analyze the performance information to identify an ability of each of multiple access points in the wireless network to provide a prospective new user access to a remote network; and produce a notification for the prospective new user, the notification indicating the ability of each of the multiple access points to provide wireless bandwidth to the prospective new user to access the remote network.

One or more embodiments herein include a computer readable storage medium and/or system having instructions stored thereon. The instructions, when executed by computer processor hardware, cause the computer processor hardware to: receive input from a user operating the mobile communication device, the user operating the mobile communication device to access a remote network via communications through one of multiple wireless access points present in a wireless network; communicate with a connection manager resource to retrieve a notification indicating a respective magnitude of available wireless bandwidth associated with each of the multiple wireless access points; receive selection of a wireless access point from the multiple wireless access points indicated as being available in the notification; and establish a wireless communication link with the selected wireless access point to access the remote network.

The ordering of the operations above has been added for clarity sake. Note that any of the processing steps as discussed herein can be performed in any suitable order.

Other embodiments of the present disclosure include software programs and/or respective hardware to perform any of the method embodiment steps and operations summarized above and disclosed in detail below.

It is to be understood that the system, method, apparatus, instructions on computer readable storage media, etc., as discussed herein also can be embodied strictly as a software program, firmware, as a hybrid of software, hardware and/or firmware, or as hardware alone such as within a processor, or within an operating system or a within a software application.

As discussed herein, techniques herein are well suited for providing notification of the availability of wireless bandwidth from each of multiple wireless access points in a network environment. However, it should be noted that embodiments herein are not limited to use in such applications and that the techniques discussed herein are well suited for other applications as well.

Additionally, note that although each of the different features, techniques, configurations, etc., herein may be discussed in different places of this disclosure, it is intended, where suitable, that each of the concepts can optionally be executed independently of each other or in combination with each other. Accordingly, the one or more present inventions as described herein can be embodied and viewed in many different ways.

Also, note that this preliminary discussion of embodiments herein purposefully does not specify every embodiment and/or incrementally novel aspect of the present disclosure or claimed invention(s). Instead, this brief description only presents general embodiments and corresponding points of novelty over conventional techniques. For additional details and/or possible perspectives (permutations) of the invention(s), the reader is directed to the Detailed Description section and corresponding figures of the present disclosure as further discussed below.

Figure 1:
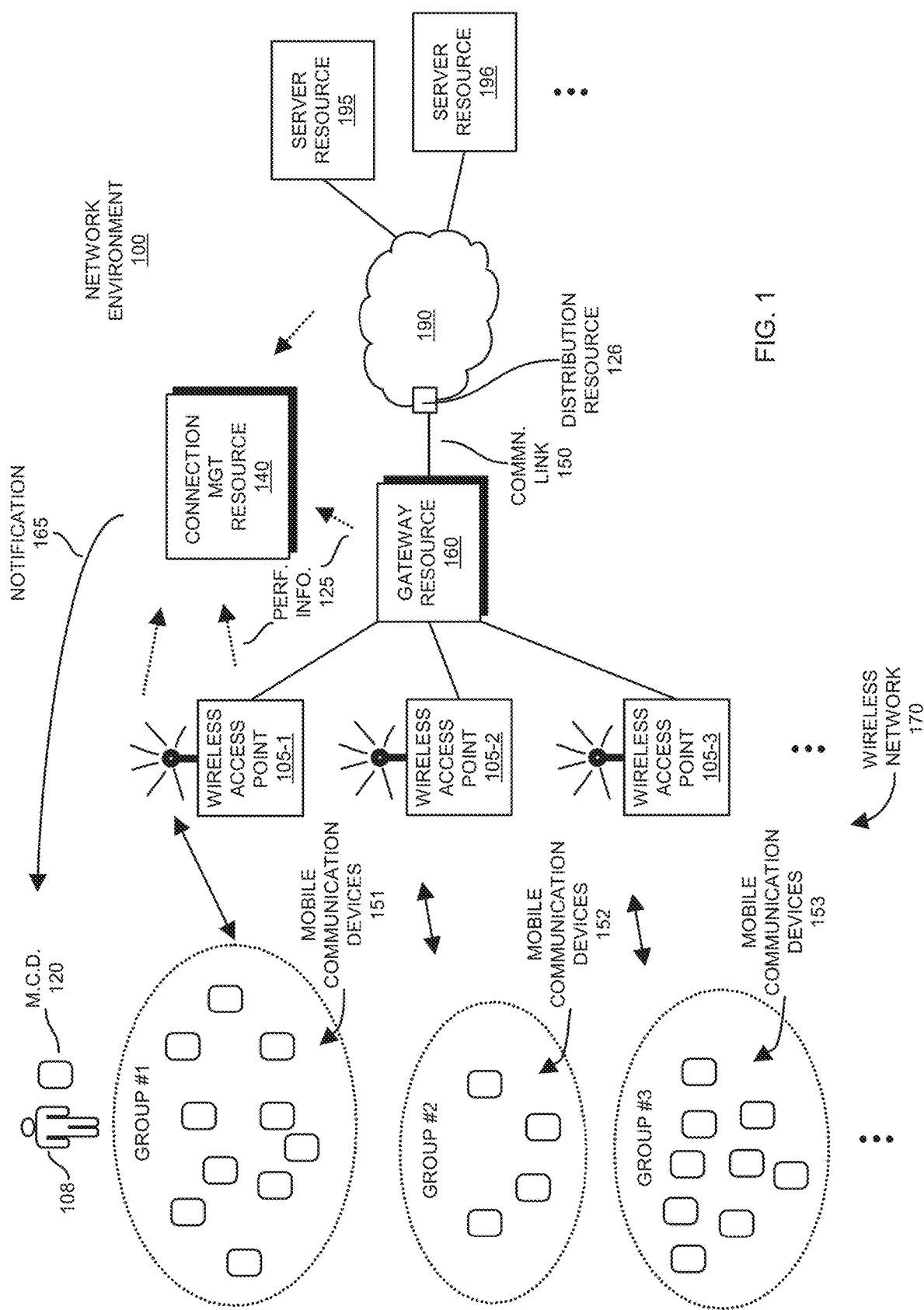
FIG. 1 is an example diagram illustrating a connection management resource facilitating connectivity in a corresponding network environment according to embodiments herein.

The foregoing and other objects, features, and advantages of the invention will be apparent from the following more particular description of preferred embodiments herein, as illustrated in the accompanying drawings in which like reference characters refer to the same parts throughout the different views. The drawings are not necessarily to scale, with emphasis instead being placed upon illustrating the embodiments, principles, concepts, etc.

DETAILED DESCRIPTION AND FURTHER SUMMARY OF EMBODIMENTS

According to embodiments herein, a connection management resource receives performance information indicative of bandwidth availability, signal strength information, upstream and downstream throughput capability, etc., associated with multiple wireless access points and related resources in a wireless network. The connection management resource analyzes the performance information to identify an ability of each of the multiple wireless access points in the wireless network to provide a prospective new user access to a remote network such as the Internet. Based on the analysis of the performance information, the connection management resource produces a notification indicating the ability of each of the multiple access points to provide wireless bandwidth to the prospective new user to access the remote network. To notify the prospective new user which of one or more available wireless access points is able to provide a good wireless connection to access the remote network, the connection management resource initiates transmission of the notification to the mobile communication device operated by the prospective new user. Via the notification, the prospective new user of a wireless access point is able to determine what to expect in terms of bandwidth after establishing a respective link with the wireless access point.

Now, more specifically, FIG. 1 is an example diagram illustrating network access management in a network environment using a connection management resource according to embodiments herein. Note that each of the functional blocks (such as mobile communication devices, wireless access points, gateway resource, connection management resource, etc.) in network environment 100 represents hardware and/or software to carry out functionality as discussed herein.

As shown, network environment 100 includes multiple groups of mobile communication devices that communicate through a respective access point to access network 190 such as the Internet. For example, wireless network 170 includes wireless access point 105-1, wireless access point 105-2, wireless access point 105-3, and so on.

In this example, group #1 includes mobile communication devices 151; group #2 includes mobile communication devices 151; group #3 includes mobile communication devices 153; and so on. Further in this example, wireless access point 105-1 provides mobile communication devices 151 and corresponding users in group #1 access to network 190 through gateway resource 160; wireless access point 105-2 provides mobile communication devices 152 and corresponding users in group #2 access to network 190 through gateway resource 160; wireless access point 105-3 provides mobile communication devices 153 and corresponding users in group #3 access to network 190 through gateway resource 160; and so on.

Note that each of the mobile communication devices 151, 152, and 153, may all reside in the same geographical region intermixed amongst each other. Each of the mobile communication devices may have communicative access to each of the wireless access points 105-1, 105-2, and 105-3.

In general, the communication devices in each of the groups share available wireless bandwidth to transmit and receive communications to a respective wireless access point. For example, mobile communication devices 151 in group #1 share use of available wireless bandwidth in the geographical region to communicate with wireless access point 105-1; mobile communication devices 152 in group #2 share use of available wireless bandwidth in the geographical region to communicate with wireless access point 105-2; mobile communication devices 153 in group #3 share use of available wireless bandwidth in the geographical region to communicate with wireless access point 105-3; and so on. As mentioned, because the wireless access points may reside in the same geographical location, each of the wireless access points 105-1, 105-2, 105-3, etc., in the network environment 100 may compete with each other for use of available RF (Radio Frequency) spectrum.

Via communications through wireless access point 105-1 and respective gateway resource 160, each of the mobile communication devices 151 in group #1 are able to simultaneously communicate with any of one or more server resources such as server resource 195, server resource 196, etc.

Network environment 100 includes gateway resource 160 and distribution resource 126. In one embodiment, the gateway resource 160 facilitates connectivity between the one or more wireless access points 105 (such as a wireless access point 105-1, wireless access point 105-2, wireless access point 105-3, etc.) and the shared communication link 150 (such as one or more cables, fiber-optic links, hardware links, etc.). Shared communication link 150 conveys communications to a remote network 190 such as the Internet.

As a more specific example, the wireless access point 105-1 facilitates conveyance of communications received (over a respective wireless link) from mobile communication devices 151 to gateway resource 160. The wireless gateway 160 transmits the communications received from the wireless access point 105-1 upstream over the shared communication link 150 to distribution resource 126. Distribution resource 126 forwards communications over network 190 to the appropriate resource having a destination address that matches the destination address of the message.

In an opposite direction, wireless gateway 160 can receive downstream communications from one or more remote resources (such as server resource 195, server resource 196, etc.) in network 190 over the shared communication link 150. The gateway resource 160 forwards the downstream communications to an appropriate wireless access point such as a wireless access point 105-1, that, in turn, distributes the communications to the appropriate mobile communication device.

In a similar manner, each of the mobile communication devices 152 in group #2 is able to communicate through a combination of wireless access point 105-2, gateway resource 160, and distribution resource 126 to transmit and receive data from resources such as server resource 195, server resource 196, etc.; each of the mobile communication devices 153 in group #3 is able to communicate through a combination of wireless access point 105-3, gateway resource 160, and distribution resource 126 to transmit data to and receive data from resources such as server resource 195, server resource 196, etc.; and so on.

In an upstream direction of the network environment 100, if desired, note that gateway resource 160 can be configured to encapsulate data packets (communications from a mobile communication device) received from the wireless access point 105-1 prior to transmitting such data packets over shared communication link 150 upstream to distribution resource 126 (such as a cable modem termination system). In one embodiment, the gateway resource 160 (such as using cable modem functionality) wraps or encapsulates the data packets with delivery information facilitating a transfer of the data packets over communication link 150 to the upstream distribution resource 126. The upstream distribution resource 126 removes the delivery information (encapsulation) and forwards the unwrapped data packets over network 190 (such as a packet-switched network). The network 190 such as the Internet facilitates distribution of the data packets to appropriate destination addresses such as to any of one or more servers (such as server resource 195, server resource 196, etc.).

In a reverse direction, if desired, the distribution resource 126 can be configured to encapsulate communications received from network 190 and transmit corresponding encapsulated data packets to the gateway resource 160. For example, the distribution resource 126 can receive a data packet addressed for delivery to a communication device in group #1. In such an instance, the distribution resource 126 encapsulates the data packet with delivery information for delivery of the data packet to gateway resource 160. The gateway resource 160 receives the data packet and removes the delivery information and forwards the respective unwrapped data packet downstream to wireless access point 105-1 for subsequent delivery over a corresponding wireless communication link to the appropriate mobile communication device in group #1.

As an alternative to encapsulating data packets, note that the gateway resource 160 and corresponding communication link 150 can be configured to support routing of data packets in accordance with a respective client/server communication protocol.

Further note that the wireless access points 105 and respective mobile communication devices in network environment 100 can communicate with each other via any suitable wireless protocol. In one non-limiting example embodiment, each of the wireless access points 105 supports communications in accordance with WiFi™ standards such as IEEE (Institute of Electrical and Electronics Engineers) 802.11a, 802.11b, 802.11g, 802.11n, 802.11ac, etc.

Further in this example embodiment as shown, mobile communication device 120 operated by user 108 resides in network environment 100. Assume that the user 108 of mobile communication device 120 wishes to establish or already has established a wireless communication link with one or more wireless access points 105 to access remote network 190.

Network environment 100 further includes connection management resource 140. Hardware and corresponding functionalities supporting connection management resource 140 can be disposed in any suitable one or more locations. For example connection management resource 140 can be disposed in gateway resource, distributed and reside in each of the wireless access points 105, etc.

As further discussed below, the connection management resource 140 can be configured to receive feedback (performance information 125) indicating an ability of the wireless access points 105 to provide a wireless connection having appropriate bandwidth to the mobile communication device 120. Based on the received feedback, the connection management resource 140 produces notification 165 for distribution to the mobile communication device 120.

As further discussed below, the notification 165 (such as one or more communications) can be distributed in any suitable manner. For example, the notification 165 can be delivered to the prospective new user 108 operating mobile communication device 120 as part of a response to a discovery request response generated by a respective wireless access point. In such an instance, the connection management resource 140 (potentially residing in each wireless access point) initiates distribution of an appropriate portion of the notification 165 to the mobile communication device 120 prior to the mobile communication device 120 associating itself with the respective wireless access point. Alternatively, the notification 165 can be distributed over a respective wireless link to the mobile communication device 120 subsequent to the mobile communication device 120 establishing a respective connection.

Figure 2:
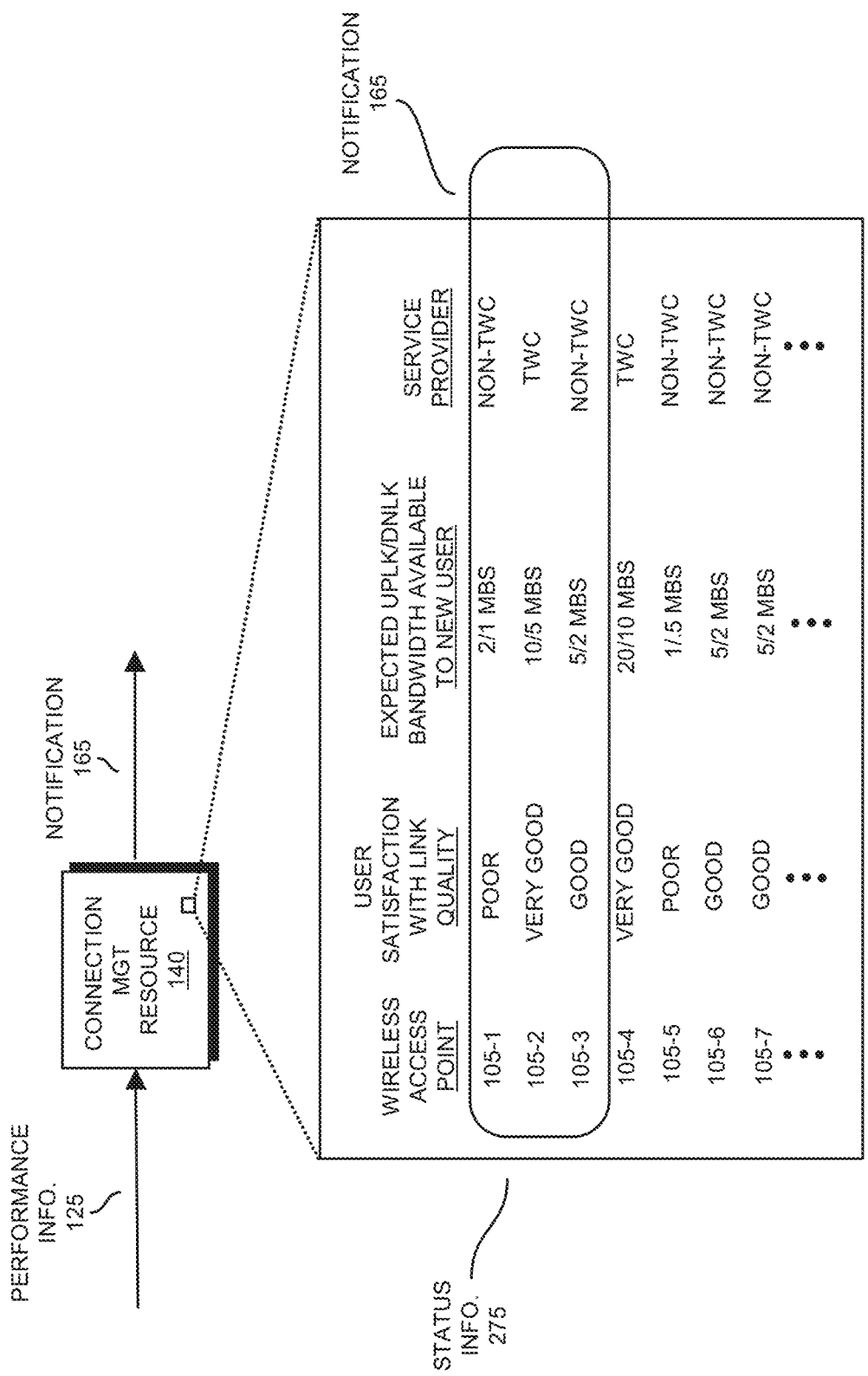
FIG. 2 is an example diagram illustrating analysis of performance information and generation of corresponding wireless access point information according to embodiments herein.

FIG. 2 is an example diagram illustrating analysis of performance information and generation of corresponding wireless access point status information according to embodiments herein.

As shown, connection management resource 140 receives performance information 125 from any of one or more resources (such as users, mobile communication devices, wireless access points, access point controllers, gateway resource, etc.). The performance information 125 can be any suitable type of feedback information from the one or more resources indicating the ability of the corresponding wireless access points 105 to support additional wireless communications for one or more new users.

By way of non-limiting example, the performance information 125 received from the one or more resources in network environment 100 can include metrics such as: i) information indicating the current load on a respective wireless access point, ii) information indicating whether or not extra wireless bandwidth is available to the wireless access point to support additional communications to a new user and/or corresponding mobile communication device, iii) information indicating a degree of wireless data traffic congestion and/or an inability of a respective wireless access point to convey data to and from gateway resource, iv) information indicating an amount of bandwidth provided to each of multiple mobile communication devices in a respective group serviced by the respective wireless access point, v) information indicating a degree to which each of the different users operating mobile communication devices are satisfied with a respective throughput, etc.

In one embodiment, the connection management resource 140 receives the performance information 125 (such as user generated feedback) from users currently accessing the remote network 190 using corresponding communication devices. In such an instance, the performance information can indicate a degree to which users of the mobile communication devices are satisfied with wireless bandwidth provided by a respective access point to access the remote network 190. Thus, the performance information 125 received by the connection management resource 140 can indicate a degree of congestion (such as from the different user's perspectives) associated with conveyance of communications between a subgroup of the multiple communication devices and a respective access point in the wireless network through which the subgroup of communication devices communicate to access the remote network.

As a more specific example, in one embodiment, already connected users operating respective mobile communication devices 151 provide feedback to the connection management resource 140 regarding their satisfaction with wireless communications supported by wireless access point 105-1 to access remote network 190; users operating respective mobile communication devices 152 provide feedback to the connection management resource 140 regarding their satisfaction with wireless communications supported by wireless access point 105-1 to access remote network 190; users operating respective mobile communication devices 153 provide feedback to the connection management resource 140 regarding their satisfaction with wireless communications supported by wireless access point 105-3 to access remote network 190; and so on.

Via an application executing on a respective mobile communication device or user assessable portal (such as a website visited by respective users), embodiments herein can include providing current users the opportunity to grade (such as number of stars, comments, rating, etc.) their corresponding wireless network connection provided by the currently used wireless access point.

Thus, the feedback from these devices and/or users provides a reasonably good indication of whether the prospective new user 108 and corresponding mobile communication device 120 will receive good service from the corresponding access point. As an example, if each of the users operating mobile communication devices 151 indicates that they experience poor wireless link quality (resulting in a slow Internet connection, low bandwidth, etc.) with the respective wireless access point 105-1, it can be assumed that if the corresponding user 108 operating mobile communication device 120 establishes a respective wireless communication link with wireless access point 105-1 that this newly established wireless communication link will be poor as well.

Conversely, if each of the users operating mobile communication devices 151 in group #1 indicates that they experience very good wireless link quality (resulting in a fast Internet connection, high bandwidth, etc.) with the respective wireless access point 105-2, it can be assumed that if the corresponding user 108 operating mobile communication device 120 establishes a respective wireless communication link with wireless access point 105-2 that this newly established wireless communication link will be very good as well.

As shown, the connection management resource 140 analyzes the performance information 125 to identify an ability of each of the multiple wireless access points 105 in the wireless network 170 to provide a prospective new user 108 (and potentially other users) access to the remote network 190. Based on the analysis of the performance information 125, the connection management resource 140 produces status information 275.

The connection management resource 140 produces the status information 275 to keep track of the ability of each of the wireless access points 105 to support additional users access to a corresponding remote network 190.

In this example embodiment, the status information 275 (from which notification 165 is derived) indicates an ability of each of the multiple access points 105 to provide wireless bandwidth to the prospective new user 108 and corresponding mobile communication device 120 to access the remote network 190.

In this example embodiment, status information 275 includes an entry for each of the available wireless access points 105 in network environment 100.

For example, for wireless access point 105-1, the status information 275 produced by the connection management resource 140 indicates that users/devices wirelessly connected to wireless access point 105-1 indicate that they (historically or currently) receive poor link quality (i.e., user satisfaction feedback from the users connected through wireless access point 105-1 is low), that a new user establishing a wireless connection with wireless access point 105-1 can expect an uplink/downlink bandwidth of 2/1 MBS (Mega Bits per Second). Status information 275 for wireless access point 105-1 further indicates that a non-TWC service provider operates the wireless access point 105-1.

For wireless access point 105-2, the status information 275 produced by the connection management resource 140 indicates that users/devices wirelessly connected to wireless access point 105-2 indicate that they (historically or currently) receive very good link quality (i.e., user satisfaction feedback from the users connected through wireless access point 105-1 is high), that a new user establishing a wireless connection with wireless access point 105-2 can expect an uplink/downlink bandwidth of 10/5 MBS (Mega Bits per Second). Status information 275 further indicates that the TWC service provider (such as a particular cable network service provider) operates the wireless access point 105-1.

For wireless access point 105-3, the status information 275 produced by the connection management resource 140 indicates that users/devices wirelessly connected to wireless access point 105-3 indicate that they (historically or currently) receive good link quality (i.e., user satisfaction feedback from the users connected through wireless access point 105-1 is good), that a new user establishing a wireless connection with wireless access point 105-2 can expect an uplink/downlink bandwidth of 5/2 MBS (Mega Bits per Second). Status information 275 further indicates that a non-TWC service provider operates the wireless access point 105-3.

In a similar manner, the connection management resource 140 produces information for each of the wireless access points 105 in network environment 100.

Connection management resource 140 derives notification 165 based on status information 275. For example, the connection management resource 140 can receive information indicating which of multiple wireless access points in the network environment 100 are within communication range of the mobile communication device 120. In one embodiment, the connection management resource 140 receives such information from the user 108 and/or mobile communication device 120 after the mobile communication device 120 performs a discovery of access points in a respective geographical region as discussed herein.

Assume in this example embodiment that the connection management resource 140 receives input indicating that the wireless access point 105-1, 105-2, and 105-3 are all within the wireless range of the mobile communication device 120. In such an instance, the connection manager resource 140 produces the notification 165 to include the first 3 entries of status information 275. That is, the connection management resource 140 produces the notification 165 to include status information associated with wireless access point 105-1, status information associated wireless access point 105-2, and status information associated with wireless access point 105-3.

As further discussed below, via the notification 165 provided by the connection management resource 140, the mobile communication device 120 and/or corresponding user 108 is able to identify which of the multiple available wireless access points (such as which of the wireless access points amongst wireless access point 105-1, wireless access point 105-2, and wireless access point 105-3) can provide a desirable throughput and, therefore, good user experience.

Additionally, via notification 165, the user 108 and/or mobile communication device 120 is able to identify a degree to which other users are satisfied with a respective wireless access point. The user 108 and/or mobile communication device 120 is also able to: identify an amount of uplink and downlink bandwidth that the new user should expect to receive for each of the wireless access points, determine whether or not the wireless access point is available from a given service provider, etc.

As further described herein, notification 165 can be transmitted as one or more communications from one or more different resources in network environment. For example, as further discussed below, the mobile communication device 120 can be configured to receive status information associated with wireless access point 105-1 from wireless access point 105-1; the mobile communication device can be configured to receive status information associated with wireless access point 105-2 from the wireless access point 105-2; mobile communication device 120 can be configured to receive status information associated with wireless access point 105-3 from the wireless access point 105-3; and so on.

Figure 3:
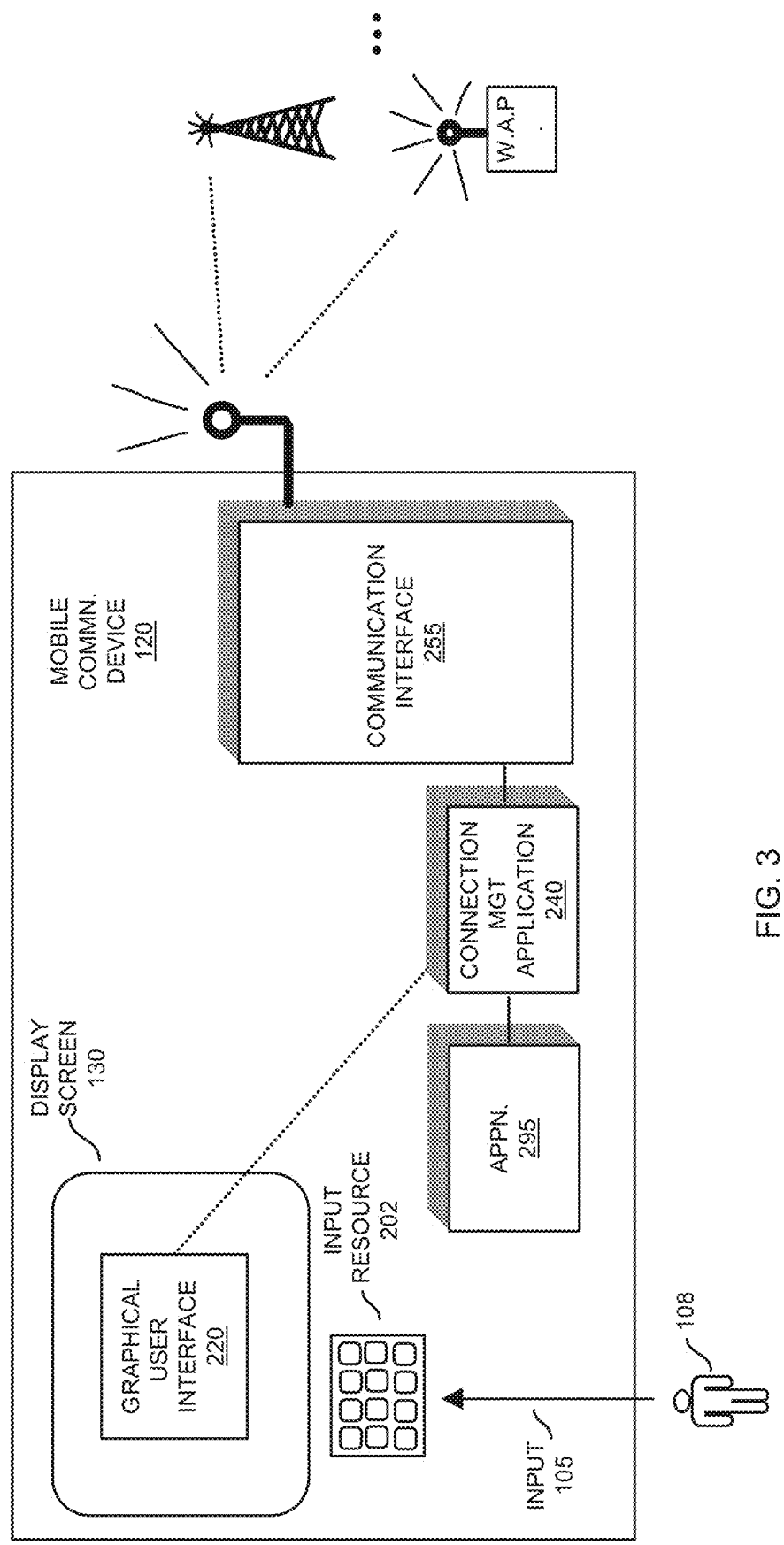
FIG. 3 is an example block diagram illustrating functional attributes and hardware resources in a mobile computer device according to embodiments herein.

FIG. 3 is an example block diagram illustrating functionality associated with a respective mobile communication device according to embodiments herein. Note that mobile communication device 120 can include any suitable hardware and software resources to carry out operations as discussed herein. Each mobile communication device in network environment 100 can operate in a similar manner and include similar resources, interfaces, applications, etc., as mobile communication device 120.

More specifically, as shown in this example embodiment, mobile communication device 120 includes display screen 130, connection management application 240, application 295 (such as a browser application), communication interface 255, etc.

Via input 105 to input resource 202 (such as a keyboard, touchscreen, mouse, etc.), assume that the user 108 initiates execution of application 295 such as a browser application. In one embodiment, subsequent to execution, the application 295 communicates with connection management application 240 to establish a respective wireless connection with a corresponding wireless access point in network environment 100. As previously discussed, a wireless connection with an access point enables the respective mobile communication device 120 to establish a wireless connection and access a remote network such as the Internet.

In response to receiving a command from application 295 to establish a network connection, the connection management application 240 (via communication interface 255) attempts to establish a respective wireless communication link with a wireless access point associated in network environment 100. The process of identifying which of one or more wireless access points are within range can include receiving one or more beacon signals generated by corresponding wireless access points 105 in network environment 100.

In one embodiment, to learn of which wireless access points are within communication range of the mobile communication device 120, the mobile communication device 120 generates and transmits a corresponding discovery request (such as a wireless communication transmitted from communication interface 255) to any of one or more listening access points 105 in network environment 100. In response to generating and transmitting the discovery request, communication interface 255 and connection management application 240 of mobile communication device 120 receives a wireless response from one or more wireless access points 105.

In one embodiment, as further discussed below, if the quality of a received signal from a respective wireless access point is above a threshold value, the respective wireless access point is considered a candidate in which to potentially establish a corresponding wireless link to access remote network 190. If the quality of the received signal is too poor, the respective wireless access point is not considered as a candidate.

As shown, via display manager 250 in mobile communication device 120, the application 295 initiates display of corresponding graphical user interface 220 on display screen 130 of mobile communication device 120. Graphical user interface 220 on display screen 130 enables the respective user 108-1 to view information such as information generated by connection management application 240, information retrieved from server resources (such as server resource 195, server resource 196, etc.) in network 190-2; and so on.

Figure 4:
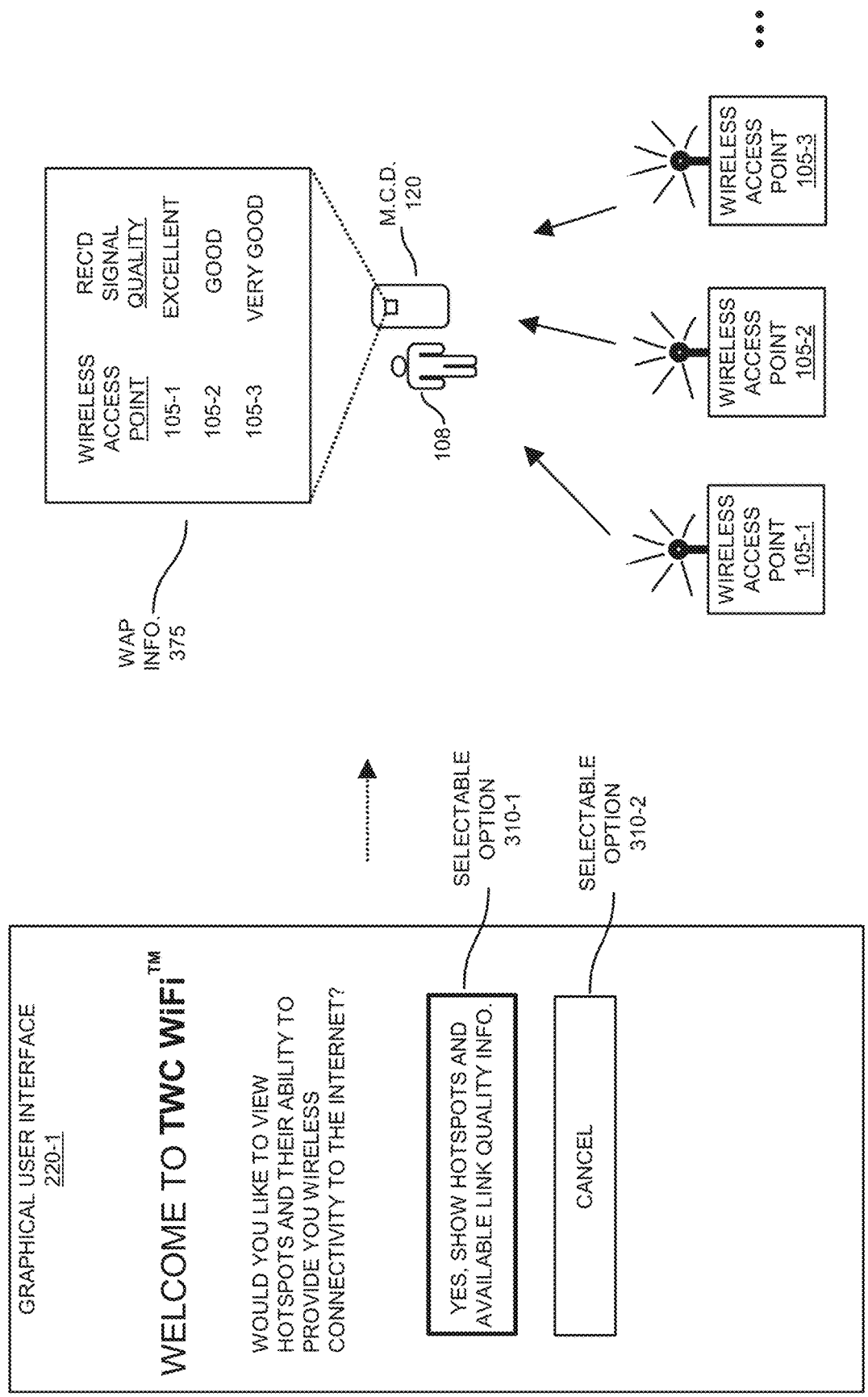
FIG. 4 is an example diagram illustrating use of a graphical user interface by a prospective new user to request information associated with wireless access points according to embodiments herein.

FIG. 4 is an example diagram illustrating use of a graphical user interface by a prospective new user to request information associated with wireless access points according to embodiments herein.

As previously discussed, assume that the user 108 operates the mobile communication device 120 to establish a respective connection with a wireless access point in network environment 100 to access remote network 190 0. In response to receiving the request to access a remote network, the display manager 250 initiates display of graphical user interface 220-1 on display screen 130 for viewing by the respective user 108.

In this non-limiting example embodiment, graphical user interface 220-1 notifies the user 108 of the ability to view hotspots and their corresponding available link quality information.

Assume in this example embodiment, that the user 108 viewing graphical user interface 220-1 on display screen 130 selects selectable option 310-1. In response to the selection, the mobile communication device 120 transmits a corresponding discovery request signal in the network environment 100. As previously discussed, each of the wireless access points within range of the mobile communication device 120 respond indicating availability. In this example, assume that the wireless access point 105-1, wireless access point 105-2, and the wireless access point 105-3 respond to the discovery request. Accordingly, embodiments herein can include receiving, at the mobile communication device 120, input (i.e., wireless signals) from the multiple wireless access points indicating their availability to the mobile communication device 120 to access the remote network; each of the multiple wireless access points resides within wireless communication range of the mobile communication device 120.

In one embodiment, the communication interface 255 of the mobile communication device 120 analyzes the received wireless signals transmitted from respective wireless access points 105-1, 105-2, and 105-3. Based on analysis of the received wireless signals, communication interface 255 produces wireless access point information 375.

As shown in this example, and as indicated by wireless access point information 375, the wireless signal transmitted by the wireless access point 105-1 and received by the mobile communication device 120 is of excellent quality; the wireless signal transmitted by the wireless access point 105-2 and received by the mobile communication device 120 is of good quality; and the wireless signal transmitted by the wireless access point 105-3 received by the mobile communication device is of very good quality. Because signal quality from each of these wireless access points is good or better than a threshold value, all 3 wireless access points 105-1, 105-2, and 105-3 are possible candidates in which to establish a corresponding wireless link and access a corresponding remote network. If received signal strength from a respective wireless access point is below a threshold value, it can be assumed that the corresponding wireless access point is not a good candidate to convey data.

Figure 5:
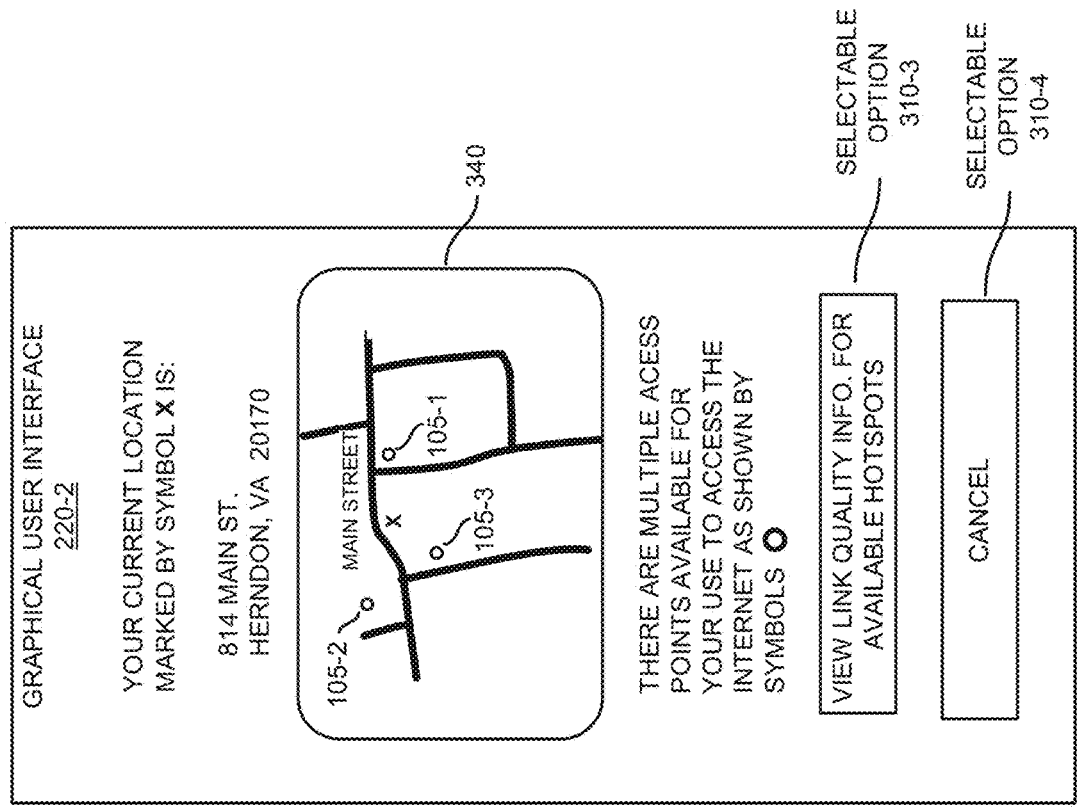
FIG. 5 is an example diagram illustrating display of available wireless access points in a map resource according to embodiments herein.

FIG. 5 is an example diagram illustrating display of available wireless access points in a map according to embodiments herein.

As a further response to receiving the request (such as the installation of the selectable option 310-1 in FIG. 3), the management application 240 initiates display of graphical user interface 220-2 on display screen 130 for viewing by the respective user 108.

In general, the graphical user interface 220-2 includes a display of map 340 indicating a current location of the user operating mobile communication device 120 as well as locations of each of the candidate wireless access points 105-1, 105-2, and 105-3 in a respective geographical region represented by map 340. Accordingly, in one example embodiment, the user 108 is able to identify a physical location of each of the available wireless access points (i.e., wireless access point 105-1, wireless access point 105-2, and wireless access point 105-3).

Assume further in this example that the user 108 activates selectable option 310-3 to view link quality information associated with each of the wireless access points 105-1, 105-2, and 105-3.

In response to receiving selection of selectable option 310-3, the mobile communication device 120 initiates retrieval of notification 165 from an appropriate resource such as connection management resource 140. As previously discussed, in one embodiment, the mobile communication device 120 notifies the connection management resource 140 of the group of wireless access points that are within communication range. In this example, this includes wireless access point 105-1, 105-2, and 105-3. The connection management resource 140 produces the notification 165 as shown in FIG. 2.

Figure 6:
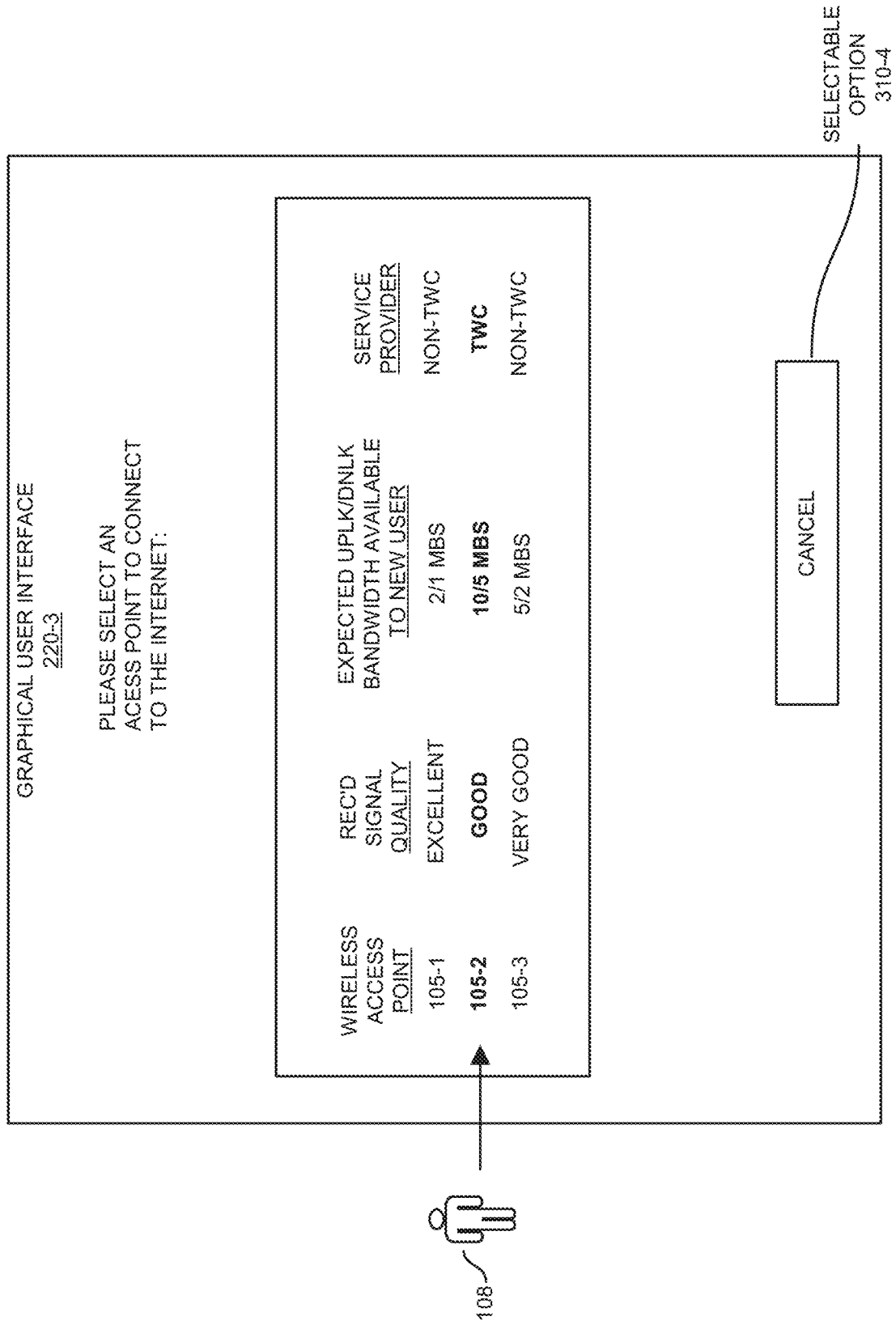
FIG. 6 is an example diagram illustrating a graphical user interface notifying a prospective new user and/or a mobile communication device of wireless access points and corresponding expected link throughput information according to embodiments herein.

FIG. 6 is an example diagram illustrating a graphical user interface displaying a received notification to a prospective new user and/or a mobile communication device according to embodiments herein. Display of the notification 165 notifies the respective mobile communication device 120 and corresponding user 108 of the ability (such as an expected uplink/downlink bandwidth available) to the user 108 for each of the wireless access points.

In one embodiment, each of the wireless access points 105 is in communication with the connection management resource 140. The connection management resource 140 can be configured to provide the notification 165 at any suitable time. For example, use of the gateway resource 160 and corresponding wireless access point may require that the user 108 and corresponding device 120 first be authorized/authenticated. In one non-limiting example embodiment, prior to authorization/authentication, the connection management resource 140 forwards the notification 165 to mobile communication device 120, enabling the corresponding user 108 and corresponding mobile communication device 120 to select an appropriate wireless access point in which to connect.

More specifically, in accordance with further embodiments, the notification 165 produced by the connection management resource 140 can indicate a respective magnitude of available wireless bandwidth associated with each of the multiple wireless access points 105-1, 105-2, and 105-3. If desired, as shown, the prospective new user 108 can initiate display of the notification 165 on display screen 130 of the communication device 120 operated by the user 108. The displayed notification 165 in graphical user interface 220-3 can indicate a ranking of each of the multiple wireless access points based on wireless bandwidth each of the multiple wireless access points is expected to provide the user 108 access to the remote network 190 subsequent to establishing a respective wireless communication link.

As an example, the connection management resource 140 can be configured to produce the notification 165 to indicate that: a first wireless access point 105-1 within wireless range of the mobile communication device 120 can provide the prospective new user 108 (and corresponding mobile communication device 120) a first throughput bandwidth (2/1 MBS on the respective uplink downlink) to access the remote network 190; a second wireless access point 105-2 within wireless range of the mobile communication device 120 can provide the prospective new user 108 (and corresponding mobile communication device 120) a second throughput bandwidth (10/5 MBS on the respective uplink/downlink) to access the remote network; a third wireless access point 105-3 within wireless range of the mobile communication device 120 can provide the prospective new user 108 (and corresponding mobile communication device 120) a third throughput bandwidth (5/2 MBS on the respective uplink/downlink) to access the remote network 190; and so on.

Assume that the prospective new user (or application executing on the corresponding mobile communication device 120) then provides further input 605 to the communication device 120 to select a wireless access point from the wireless access point ranking information as specified by the displayed notification information. For example, in this example embodiment, the input 605 specifies a selection of wireless access point 105-2 (such as one that provides the highest available bandwidth) from the multiple wireless access points indicated in the notification 165 as being available. Based on input 605, the connection management application 240 in the mobile communication device 120 then establishes a new wireless communication link with the selected wireless access point 105-2 to access the remote network.

In this manner, the prospective new user 108 (or corresponding software executing on the mobile communication device 120) is able to select a respective wireless access point that is able to meet its data throughput needs. In other words, as previously discussed, the prospective new user 108 and connection management application 240 are able to identify an amount of wireless bandwidth to expect after establishing a respective communication link with the selected wireless access point 105-2.

In other words, according to embodiments herein, prior to or after establishing a data communication link between the mobile communication device 120 and a respective wireless access point, the notification 165 enables the prospective new user 108 or corresponding device 120 to identify which of multiple available wireless access points 105 is best suited to provide a desired data throughput capability resulting in a good user experience (such as sufficient bandwidth). If the respective mobile communication device 120 currently uses another wireless access point to access the remote network 190, and then receives notification 165, the mobile communication device 120 can potentially switch over to a new wireless access point that will provide a better data throughput.

Subsequent to establishing the wireless communication link with the selected wireless access point 105-2, via further input from the user 108, the mobile communication device 120 can be configured to transmit a request for content over the newly established wireless communication link through the selected access point 105-2 to the remote network 190. In response to transmitting the request for content, in a manner as previously discussed, the mobile communication device 120 receives the content over the newly established wireless communication link from the selected wireless access point 105-2.

Figure 7:
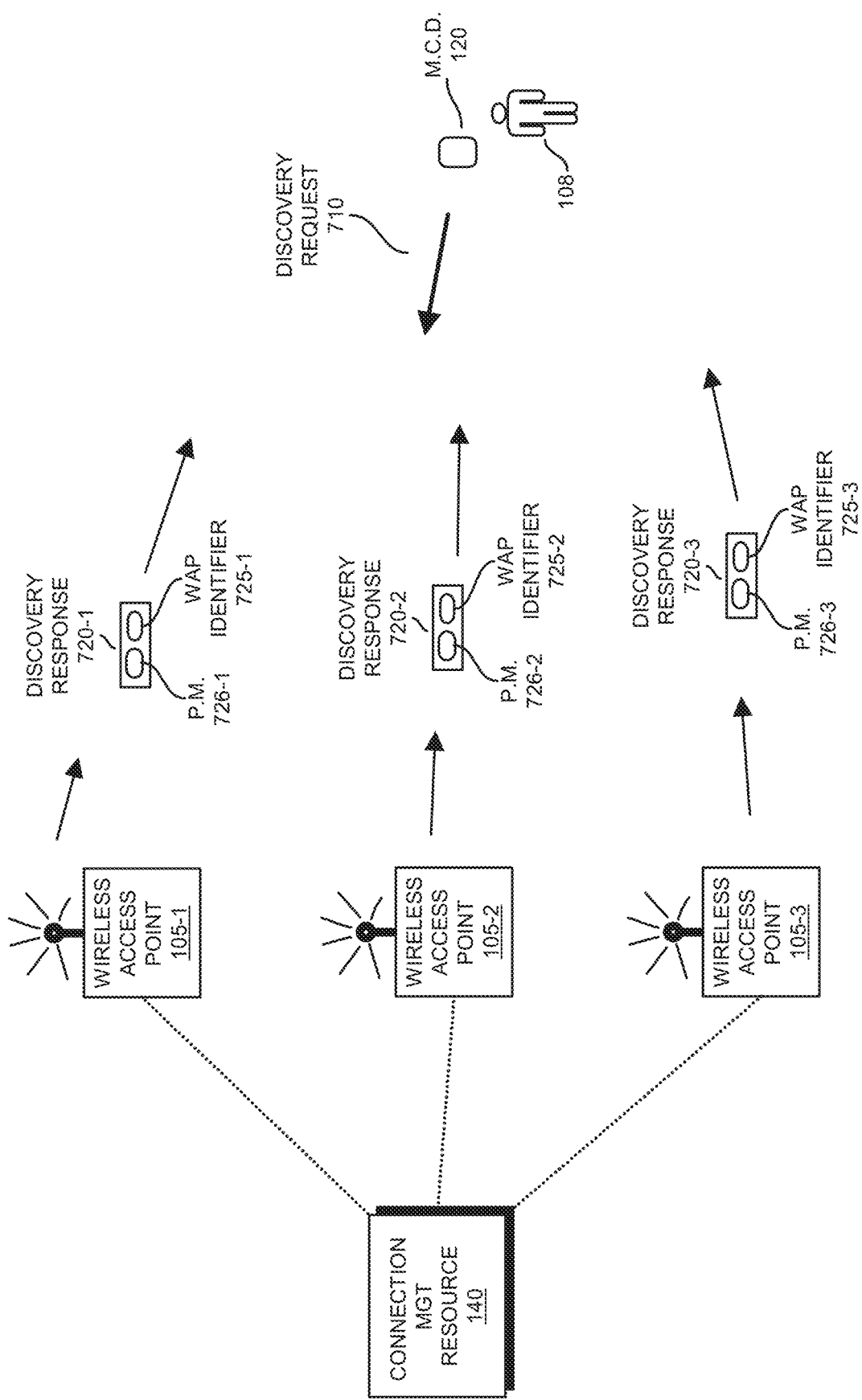
FIG. 7 is an example diagram illustrating a manner in which to distribute wireless access point performance metrics/information to a prospective new user operating a mobile communication device according to embodiments herein.

FIG. 7 is another example diagram illustrating the manner in which to notify a prospective new user whether or not a corresponding wireless access point will provide sufficient bandwidth according to embodiments herein.

In a manner as previously discussed, the mobile communication device 120 can be configured to generate a discovery request 710 to learn of the different wireless access points that are available to support wireless connectivity. In one example embodiment, in addition to providing identity information of the wireless access point, the respective wireless access point can additionally include information in the discovery response indicating the performance of the wireless access point.

As a more specific example, in response to receiving the discovery request 710 from mobile communication device 120 attempting to identify available wireless access points in the network environment 100, the wireless access point 105-1 produces a discovery response 720-1 (one or more communications). The discovery response 720-1 includes a wireless access point identifier 725-1 indicating an identity of the responding wireless access point 105-1. The discovery response 720-1 further includes a performance metric 726-1 (wireless access point information) indicating an ability of the respective wireless access point 105-1 to support additional wireless communications with a new communication device. The performance metric 726-1 can include any of the information as discussed above in notification 165 associated with one or more wireless access points 105 such as wireless access point 105-1 information indicating expected uplink/downlink bandwidth available (2/1 MBS), a grade (POOR) indicating whether other mobile users of mobile communication devices are satisfied with throughput capability of the wireless access point 105-1, etc.

In response to receiving the discovery request 710 from mobile communication device 120 attempting to identify available wireless access points in the network environment 100, the wireless access point 105-2 produces a discovery response 720-2 (one or more communications). The discovery response 720-2 includes a wireless access point identifier 725-2 indicating an identity of the responding wireless access point 105-2. The discovery response 720-2 further includes a performance metric 726-2 (wireless access point information) indicating an ability of the respective wireless access point 105-2 to support additional wireless communications with a new communication device. The performance metric 726-2 can include any of the information as discussed above in notification 165 associated with one or more wireless access points 105 such as wireless access point 105-2 information indicating expected uplink/downlink bandwidth available (10/5 MBS), a grade (VERY GOOD) indicating whether other mobile users of mobile communication devices are satisfied with throughput capability of the wireless access point 105-2, etc.

In response to receiving the discovery request 710 from mobile communication device 120 attempting to identify available wireless access points in the network environment 100, the wireless access point 105-3 produces a discovery response 720-3 (one or more communications). The discovery response 720-3 includes a wireless access point identifier 725-3 indicating an identity of the responding wireless access point 105-3. The discovery response 720-3 further includes a performance metric 726-3 and (wireless access point information) indicating an ability of the respective wireless access point 105-2 to support additional wireless communications with a new communication device. The performance metric 726-3 can include any of the information as discussed above in notification 165 associated with one or more wireless access points 105 such as such as wireless access point 105-3 information indicating expected uplink/downlink bandwidth available (10/5 MBS), a grade (VERY GOOD) indicating whether other mobile users of mobile communication devices are satisfied with throughput capability of the wireless access point 105-3, etc.

Accordingly, via the discovery responses 720 transmitted from each of the wireless access point 105-1, 105-2, 105-3, etc., the prospective new user 108 operating mobile communication device 120 is able to identify which of the corresponding responding wireless access points 105 is best-suited (such as based on performance metrics 726, received signal strength of the discovery response 720, etc.).

As previously discussed above, as an alternative to receiving performance metrics from the wireless access points, if so configured, the mobile communication device 120 operated by the prospective new user 108 can notify the connection management resource 140 which of multiple wireless access points are good candidate wireless access points within wireless communication range of the mobile communication device 120. The mobile communication device 120 can determine which of the wireless access points 105 in a geographical region are good candidates based on one or more metrics such as received signal strength, signal-to-noise ratio, etc., associated with received wireless signals from the access points.

Figure 8:
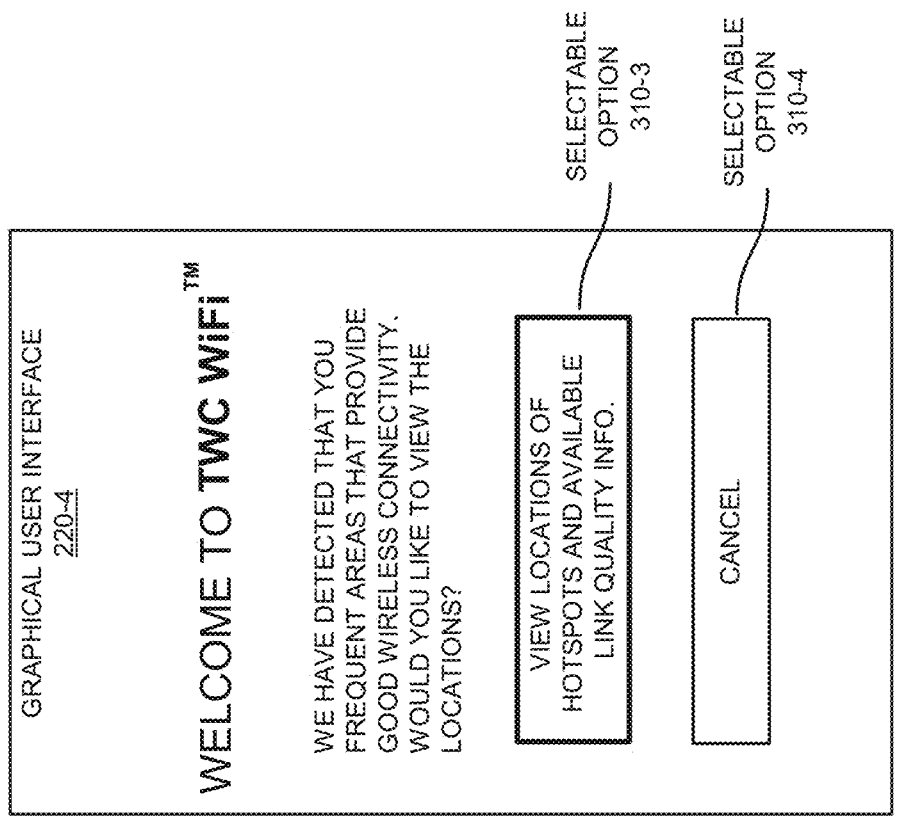
FIG. 8 is an example diagram illustrating a graphical user interface indicating availability of one or more wireless access points according to embodiments herein.

FIG. 8 is an example diagram illustrating a graphical user interface indicating availability of one or more wireless access points according to embodiments herein.

As previously discussed, the connection management resource 140 keeps track of the ability of each of the wireless access points 105 in network environment 100 to support wireless communications with users. Further embodiments herein can include monitoring a location of the mobile communication device 120 as the respective user 108 moves about a corresponding geographical region.

Assume further in this example embodiment that the connection management resource 140 has knowledge of a location of each of the wireless access points. Via comparison of the current location of the mobile communication device with respect to the wireless access point, the connection management resource 140 can determine when the mobile communication device 120 passes by a respective wireless access point that has the ability to provide good wireless connectivity to access the remote network 190. In this manner, the connection management resource 140 can detect areas frequented by the user 108 and corresponding mobile communication device 120 that include a corresponding wireless access point having the ability to provide good wireless connectivity.

In one embodiment, in response to detecting wireless access points that may be of interest to the corresponding user 108 of mobile communication device 120, the connection management application 240 in mobile communication device 120 initiates display of graphical user interface 220-4 on display screen 130. As shown, to view locations of hotspots and available link quality information, the user 108 select selectable option 310-3 to view such location of wireless access points and corresponding available link quality information. The operation can be canceled via selection of selectable option 310-4.

Accordingly, embodiments herein can include letting people (users) know if they were nearby a hotspot during their daily/weekly/monthly routine but didn't actually connect to them. The message included in the graphical user interface 220-4 can display a respective message such as "you were within 1 mile of 10 TWC hotspots yesterday", thus proactively letting the user 108 know that they could have used a respective wireless access point providing good connectivity if they had tried to connect with it.

Figure 9:
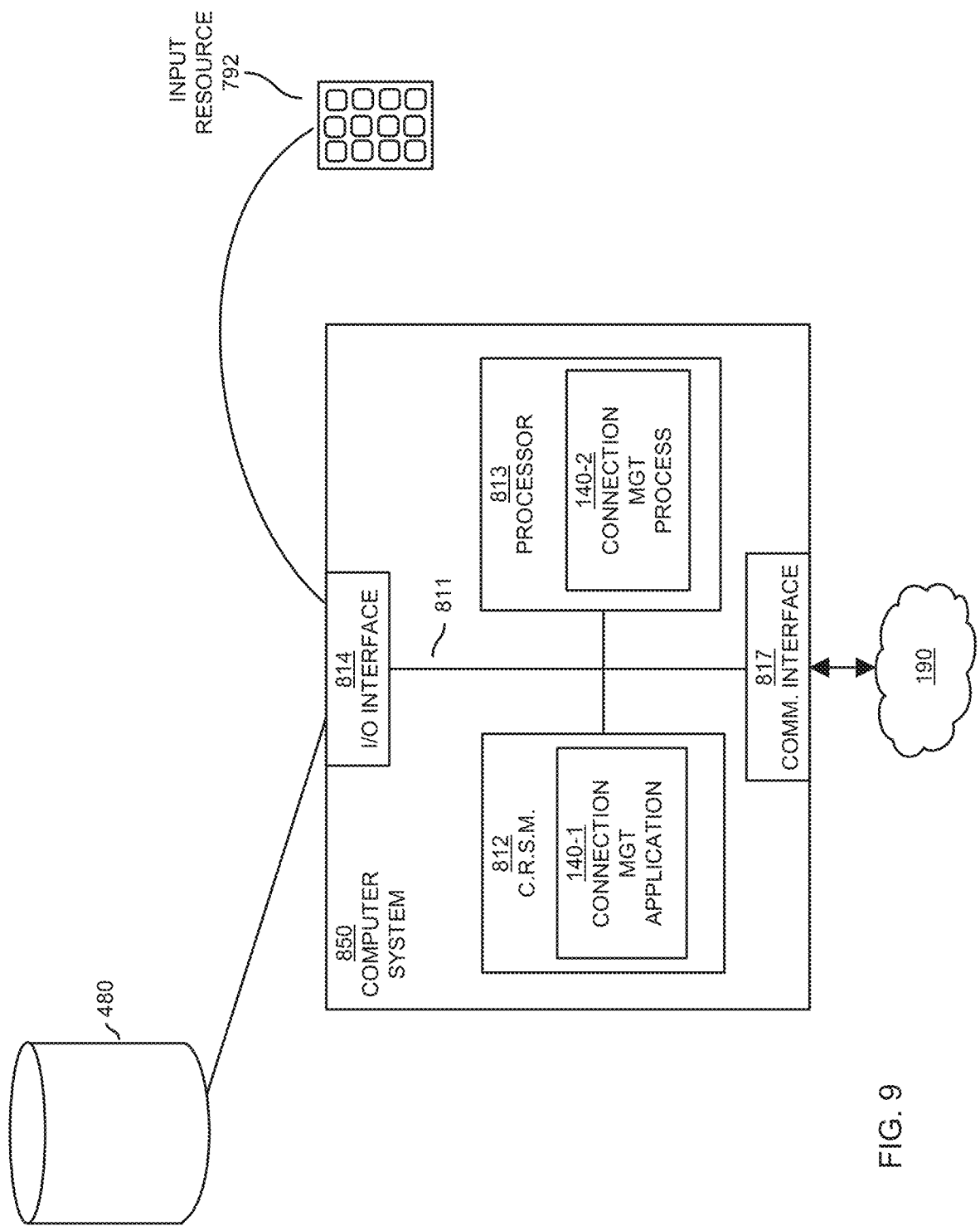
FIG. 9 is a diagram illustrating an example computer architecture in which to execute any functionality according to embodiments herein.

FIG. 9 is an example block diagram of a computer device for implementing any of the operations as discussed herein according to embodiments herein.

In one embodiment, connection management resource 140 is implemented by one or more computers such as computer system 850 to carry out one or more operations as discussed herein.

As shown, computer system 850 of the present example includes an interconnect 811, a processor 813 (such as one or more processor devices, computer processor hardware, etc.), computer readable storage medium 812 (such as hardware storage to store data), I/O interface 814, and communications interface 817.

Interconnect 811 provides connectivity amongst processor 813, computer readable storage media 812, I/O interface 814, and communication interface 817.

I/O interface 814 provides connectivity to a repository 480 and, if present, other devices such as a playback device, display screen, input resource 792, a computer mouse, etc.

Computer readable storage medium 812 (such as a non-transitory hardware medium) can be any hardware storage resource or device such as memory, optical storage, hard drive, rotating disk, etc. In one embodiment, the computer readable storage medium 812 stores instructions executed by processor 813.

Communications interface 817 enables the computer system 850 and processor 813 to communicate over a resource such as network 190 to retrieve information from remote sources and communicate with other computers. I/O interface 814 enables processor 813 to retrieve stored information such as from repository 480.

As shown, computer readable storage media 812 is encoded with connection management application 140-1 (e.g., software, firmware, etc.) executed by processor 813 (hardware). Connection management application 140-1 can be configured to include instructions to implement any of the operations as discussed herein.

During operation of one embodiment, processor 813 (e.g., computer processor hardware) accesses computer readable storage media 812 via the use of interconnect 811 in order to launch, run, execute, interpret or otherwise perform the instructions in the connection management application 140-1 stored on computer readable storage medium 812.

Execution of the connection management application 140-1 produces processing functionality such as connection management process 140-2 in processor 813. In other words, the connection management process 140-2 associated with processor 813 represents one or more aspects of executing connection management application 140-1 within or upon the processor 813 in the computer system 850.

Those skilled in the art will understand that the computer system 850 can include other processes and/or software and hardware components, such as an operating system that controls allocation and use of hardware resources to execute connection management application 140-1.

In accordance with different embodiments, note that computer system may be any of various types of devices, including, but not limited to, a wireless access point, a mobile computer, a personal computer system, a wireless device, base station, phone device, desktop computer, laptop, notebook, netbook computer, mainframe computer system, handheld computer, workstation, network computer, application server, storage device, a consumer electronics device such as a camera, camcorder, set top box, mobile device, video game console, handheld video game device, a peripheral device such as a switch, modem, router, or in general any type of computing or electronic device. The computer system 850 may reside at any of one or more locations or can be included in any suitable one or more resource in network environment 100 to implement functionality as discussed herein.

Functionality supported by the different resources will now be discussed via flowcharts in FIGS. 10 and 11. Note that the steps in the flowcharts below can be executed in any suitable order.

Figure 10:
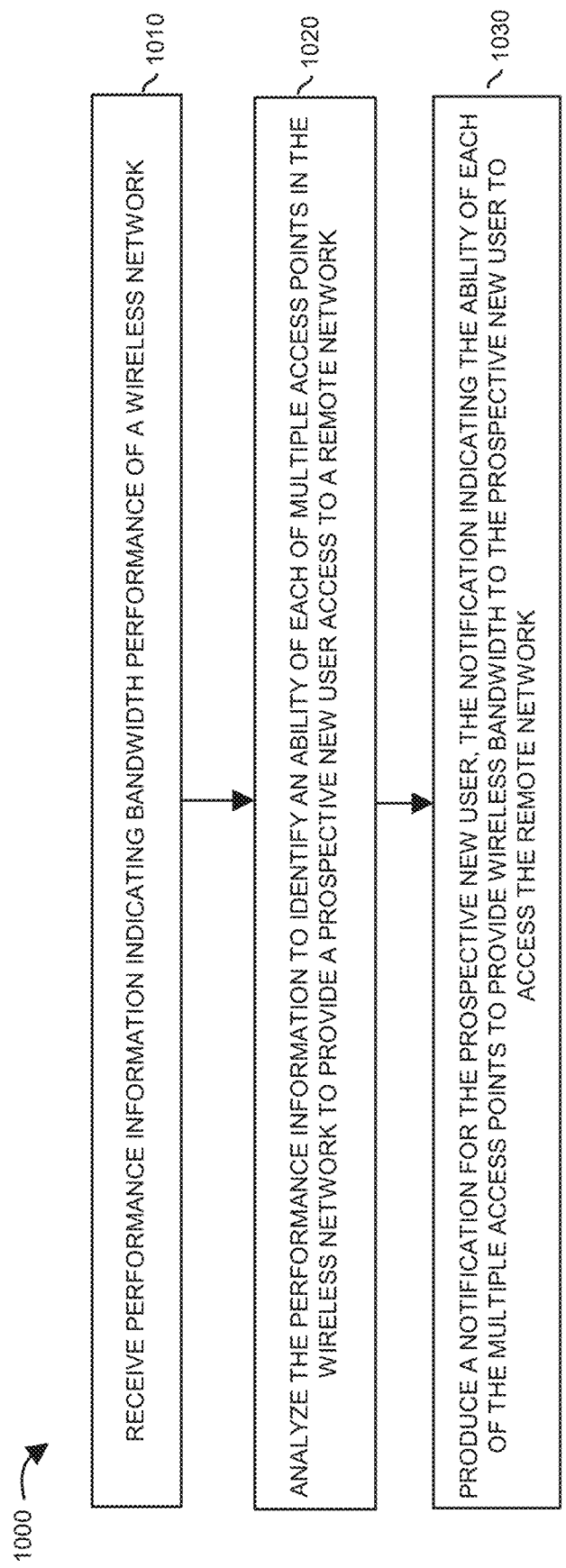
FIGS. 10 and 11 are example diagrams illustrating according to embodiments herein.

FIG. 10 is a flowchart 1000 illustrating an example method according to embodiments. Note that there will be some overlap with respect to concepts as discussed above.

In processing block 1010, the connection management resource 140 receives performance information 125 indicative of available bandwidth and wireless network 170.

In processing block 1020, the connection management resource 140 analyzes the performance information 125 to identify an ability of each of multiple wireless access points 105 in the wireless network 170 to provide a prospective new user 108 access to a remote network 190.

In processing block 1030, the connection management resource 140 produces a notification 165 for the prospective new user 108 and/or mobile communication device 120. The notification 165 indicates an ability of each of the multiple access points to provide wireless bandwidth to the prospective new user to access the remote network 190.

Figure 11:
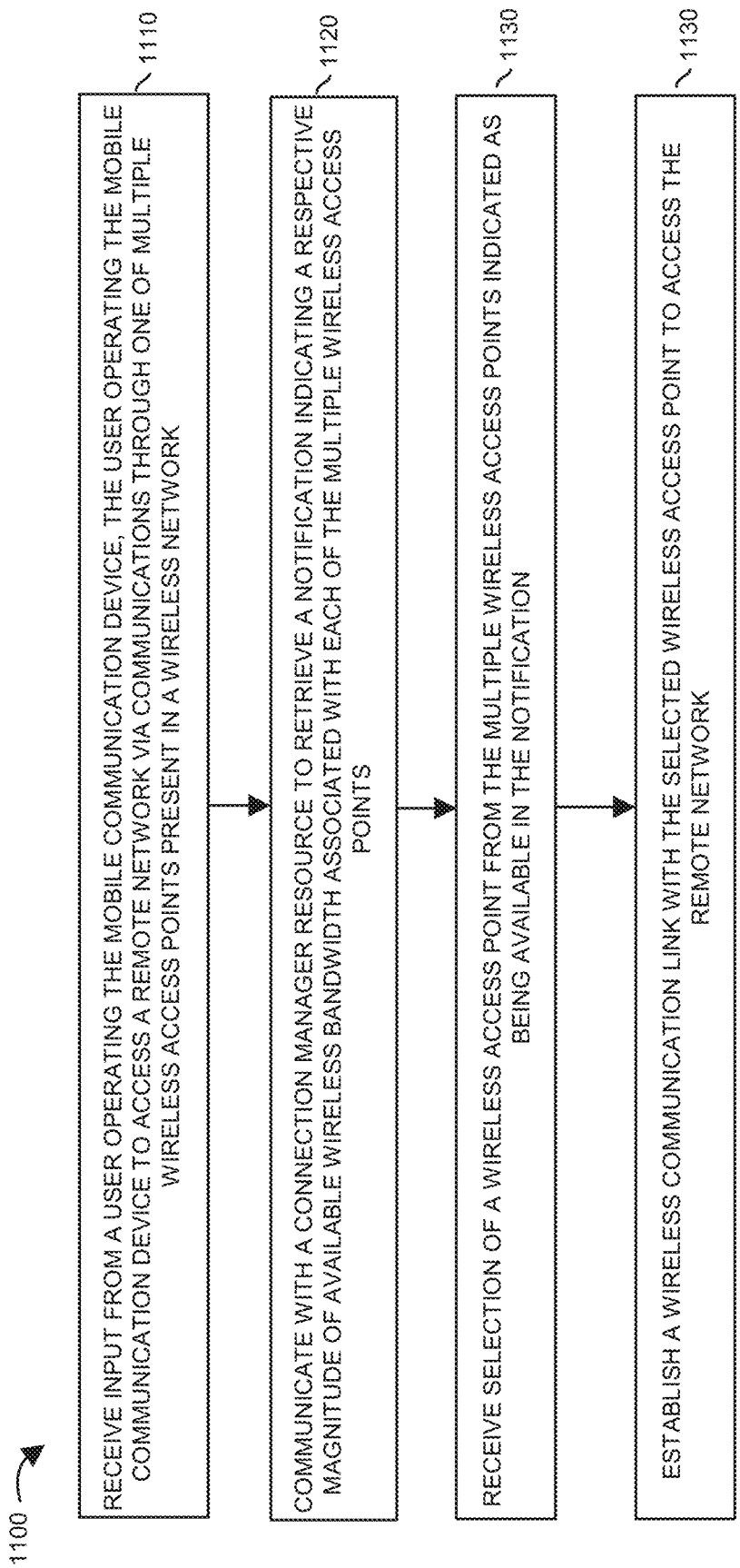

FIG. 11 is a flowchart 1100 illustrating an example method according to embodiments. Note that there will be some overlap with respect to concepts as discussed above.

In processing block 1110, the mobile communication device 120 receives input 105 from the user 108 operating the mobile communication device 120. The user 108 operates the mobile communication device 120 to access remote network 190 via communications through one of multiple wireless access points 105 present in wireless network 170.

In processing block 1120, the mobile communication device 120 communicates with connection manager resource 140 to retrieve notification 165 indicating a respective magnitude of available wireless bandwidth associated with each of the multiple wireless access points 105.

In processing block 1130, the mobile communication device 120 receives selection of a particular wireless access point from the multiple wireless access points indicated as being available by the notification 165.

In processing block 1140, the mobile communication device establishes a wireless communication link with the selected wireless access point to access the remote network 190.

Note again that techniques herein are well suited for providing notification of the ability of each of multiple wireless access points to provide connectivity to a remote network such as the Internet. However, it should be noted that embodiments herein are not limited to use in such applications and that the techniques discussed herein are well suited for other applications as well.

Based on the description set forth herein, numerous specific details have been set forth to provide a thorough understanding of claimed subject matter. However, it will be understood by those skilled in the art that claimed subject matter may be practiced without these specific details. In other instances, methods, apparatuses, systems, etc., that would be known by one of ordinary skill have not been described in detail so as not to obscure claimed subject matter. Some portions of the detailed description have been presented in terms of algorithms or symbolic representations of operations on data bits or binary digital signals stored within a computing system memory, such as a computer memory. These algorithmic descriptions or representations are examples of techniques used by those of ordinary skill in the data processing arts to convey the substance of their work to others skilled in the art. An algorithm as described herein, and generally, is considered to be a self-consistent sequence of operations or similar processing leading to a desired result. In this context, operations or processing involve physical manipulation of physical quantities. Typically, although not necessarily, such quantities may take the form of electrical or magnetic signals capable of being stored, transferred, combined, compared or otherwise manipulated. It has been convenient at times, principally for reasons of common usage, to refer to such signals as bits, data, values, elements, symbols, characters, terms, numbers, numerals or the like. It should be understood, however, that all of these and similar terms are to be associated with appropriate physical quantities and are merely convenient labels. Unless specifically stated otherwise, as apparent from the following discussion, it is appreciated that throughout this specification discussions utilizing terms such as "processing," "computing," "calculating," "determining" or the like refer to actions or processes of a computing platform, such as a computer or a similar electronic computing device, that manipulates or transforms data represented as physical electronic or magnetic quantities within memories, registers, or other information storage devices, transmission devices, or display devices of the computing platform.

While this invention has been particularly shown and described with references to preferred embodiments thereof, it will be understood by those skilled in the art that various changes in form and details may be made therein without departing from the spirit and scope of the present application as defined by the appended claims. Such variations are intended to be covered by the scope of this present application. As such, the foregoing description of embodiments of the present application is not intended to be limiting. Rather, any limitations to the invention are presented in the following claims.

We claim:

1. A method comprising:
   receiving input from a user operating a first mobile communication device, the user operating the first mobile communication device to access a remote network;
   retrieving a notification indicating a respective magnitude of available wireless bandwidth associated with each of multiple wireless access points, the notification including user satisfaction information indicating a degree to which users of mobile communication devices other than the first mobile communication device are satisfied with wireless bandwidth provided by the multiple wireless access points to access the remote network; and
   establishing a wireless communication link between the first mobile communication device and a wireless access point selected from the notification to access the remote network.

2. The method as in claim 1,
   wherein a corresponding magnitude of available bandwidth associated with the selected wireless access point is based on feedback from a set of mobile communication devices other than the first mobile communication device.

3. The method as in claim 1, wherein the notification indicates availability of bandwidth associated with a first wireless access point based on: i) first feedback received from a first communication device in communication with the first wireless access point, the first feedback indicating wireless link quality of the first communication device communicating with the first wireless access point, and ii) second feedback received from a second communication device in communication with the first wireless access point, the second feedback indicating wireless link quality of the second communication device communicating with the first wireless access point; and
   wherein the first wireless access point is the selected wireless access point.

4. The method as in claim 1 further comprising:
   subsequent to establishing the wireless communication link, transmitting a request for content over the wireless communication link through the selected access point to the remote network; and
   in response to transmitting the request for content, receiving the content as specified by the request over the wireless communication link from the selected wireless access point.

5. The method as in claim 1 further comprising:
   at the first mobile communication device, receiving input from the multiple wireless access points indicating their availability to the first mobile communication device to access the remote network, each of the multiple wireless access points residing within wireless communication range of the first mobile communication device.

6. The method as in claim 5, wherein retrieving the notification includes transmitting identities of the multiple wireless access points to a connection manager resource, the connection manager resource ranking the multiple wireless access points for use by the first mobile communication device based on expected bandwidth availability.

7. The method as in claim 1, wherein a connection manager resource ranks the multiple wireless access points based on performance information indicating a degree of congestion associated with conveyance of communications between the mobile communication devices accessing the remote network through the multiple wireless access points.

8. The method as in claim 1, wherein a connection manager resource ranks the multiple wireless access points based on performance information indicating a degree to which users of the mobile communication devices other than the first mobile communication device are satisfied with wireless bandwidth provided by the multiple wireless access points to access the remote network.

9. The method as in claim 1 further comprising:
   initiating display of the notification on a display screen of the first mobile communication device operated by the user, the displayed notification indicating each of the multiple wireless access points based on wireless bandwidth each of the multiple wireless access points has available to provide the user access to the remote network.

10. The method as in claim 9, wherein the available wireless bandwidth for each of the multiple wireless access points is based on performance information received from users of the multiple communication devices, the performance information indicating an ability of the multiple wireless access points to provide a prospective new user operating a client device access to the remote network through the wireless access point.

11. The method as in claim 1, wherein the user satisfaction information is generated by the users of the mobile communication devices other than the first mobile communication device.

12. The method as in claim 1, wherein the notification indicates: i) an identity of a first wireless access point of the multiple wireless access points, and ii) an identity of a second wireless access point of the multiple wireless access points; and
   wherein the user satisfaction information indicates: i) a first user-generated level of quality metric indicating user satisfaction of wireless communications supported by the first wireless access point, ii) a second user-generated level of quality metric indicating user satisfaction of wireless communications supported by the second wireless access point.

13. The method as in claim 12, wherein the notification indicates: i) a first bandwidth metric indicating bandwidth available from the first wireless access point, and ii) a second bandwidth metric indicating bandwidth available from the second wireless access point.

14. The method as in claim 12, wherein the notification further indicates a respective service provider identity associated with each of the multiple wireless access points.

15. The method as in claim 1, wherein the notification includes a ranking of the multiple access points based on feedback provided by respective users of the mobile communication devices.

16. The method as in claim 1, wherein the feedback is performance information generated by respective users as input to the multiple communication devices.

17. The method as in claim 1, wherein the notification is based on feedback of respective users operating the mobile communication devices, the feedback indicating, from users' perspectives, an amount of bandwidth provided to the users.

18. The method as in claim 1, wherein the notification indicates an anticipated amount of wireless bandwidth to be provided to the first mobile communication device.

19. A system comprising:
a first mobile communication device operable to:
receive input from a user operating the first mobile communication device, the user operating the first mobile communication device to access a remote network;
retrieve a notification indicating a respective magnitude of available wireless bandwidth associated with each of multiple wireless access points, the notification further including user satisfaction information indicating a degree to which users of other communication devices are satisfied with wireless bandwidth provided by the multiple wireless access points to access the remote network; and
establish a wireless communication link between the first mobile communication device and a wireless access point selected from the notification to access the remote network.

20. The system as in claim 19,
wherein a corresponding magnitude of available bandwidth associated with the selected wireless access point is based on performance feedback from a set of mobile communication devices other than the first mobile communication device.

21. The method as in claim 19, wherein the notification indicates availability of bandwidth associated with a first wireless access point based on: i) first feedback received from a second communication device in communication with the first wireless access point, the first feedback indicating wireless link quality of the second communication device communicating with the first wireless access point, and ii) second feedback received from a third communication device in communication with the first wireless access point, the second feedback indicating wireless link quality of the third communication device communicating with the first wireless access point; and
wherein the first wireless access point is the selected wireless access point.

22. The system as in claim 19 further comprising:
subsequent to establishing the wireless communication link, transmitting a request for content over the wireless communication link from the first mobile communication device through the selected access point to the remote network; and
in response to transmitting the request for content, at the first mobile communication device, receiving the content as specified by the request over the wireless communication link from the selected wireless access point.

23. The system as in claim 19 further comprising:
at the mobile communication device, receiving input from the multiple wireless access points indicating their availability to the mobile communication device to access the remote network, each of the multiple wireless access points residing within wireless communication range of the mobile communication device.

24. The system as in claim 23, wherein retrieving the notification includes transmitting identities of the multiple wireless access points to a connection manager resource, the connection manager resource ranking the multiple wireless access points for use by the mobile communication device based on expected bandwidth availability.

25. The system as in claim 19 further comprising:
a connection manager resource operable to rank the multiple wireless access points based on performance information indicating a degree of congestion associated with conveyance of communications between other communication devices accessing the remote network through the multiple wireless access points.

26. The system as in claim 19 further comprising:
a connection manager operable to rank the multiple wireless access points based on performance information indicating a degree to which users of other mobile communication devices are satisfied with wireless bandwidth provided by the multiple wireless access points to access the remote network.

27. The system as in claim 19, wherein the mobile communication device is further operable to:
display the notification on a display screen of the communication device operated by the user, the displayed notification indicating identities of each of the multiple wireless access points and an amount of corresponding wireless bandwidth each of the multiple wireless access points has available to provide the user access to the remote network.

28. The system as in claim 27, wherein the available wireless bandwidth for each of the multiple wireless access points is based on performance information received from users of the multiple communication devices indicating an ability of the multiple wireless access points to provide a prospective new user operating a client device access to the remote network through the wireless access point.

29. Computer-readable storage hardware having instructions stored thereon, the instructions, when carried out by computer processor hardware, cause the computer processor hardware to:
receive input from a user operating a first mobile communication device, the user operating the first mobile communication device to access a remote network;
retrieve a notification indicating a respective magnitude of available wireless bandwidth associated with each of multiple wireless access points, the notification including user satisfaction information indicating a degree to which users of mobile communication devices other than the first mobile communication device are satisfied with wireless bandwidth provided by the multiple wireless access points to access the remote network; and
establish a wireless communication link between the first mobile communication device and a wireless access point selected from the notification to access the remote network.

* * * * *